United States Patent
Niebling et al.

(10) Patent No.: US 11,285,910 B2
(45) Date of Patent: Mar. 29, 2022

(54) SAFETY BELT FOR A VEHICLE

(71) Applicant: Daimler AG, Stuttgart (DE)

(72) Inventors: Frank Niebling, Ulm (DE); Yannick Dietrich, Markdorf (DE); Steffen Kampmann, Dresden (DE)

(73) Assignee: Daimler AG, Stuttgart (DE)

( * ) Notice: Subject to any disclaimer, the term of this patent is extended or adjusted under 35 U.S.C. 154(b) by 121 days.

(21) Appl. No.: 16/616,706

(22) PCT Filed: May 8, 2018

(86) PCT No.: PCT/EP2018/061746
§ 371 (c)(1),
(2) Date: Nov. 25, 2019

(87) PCT Pub. No.: WO2018/215195
PCT Pub. Date: Nov. 29, 2018

(65) Prior Publication Data
US 2021/0170986 A1    Jun. 10, 2021

(30) Foreign Application Priority Data

May 26, 2017 (DE) ...................... 10 2017 005 053.8
Jun. 7, 2017 (DE) ...................... 10 2017 005 443.6

(51) Int. Cl.
*B60R 22/12* (2006.01)

(52) U.S. Cl.
CPC .................... *B60R 22/12* (2013.01)

(58) Field of Classification Search
CPC ...................................... B60R 22/12
USPC .................................................. 297/464–488
See application file for complete search history.

(56) References Cited

U.S. PATENT DOCUMENTS

| 6,082,763 | A | * | 7/2000 | Kokeguchi | B60R 21/18 |
| | | | | | 280/733 |
| 6,217,063 | B1 | | 4/2001 | Takeuchi | |
| 6,641,165 | B2 | * | 11/2003 | Ohhashi | B60R 21/18 |
| | | | | | 280/733 |
| 2007/0069509 | A1 | | 3/2007 | Kokeguchi et al. | |
| 2008/0303252 | A1 | | 12/2008 | Ohhashi | |

FOREIGN PATENT DOCUMENTS

| CN | 1939780 A | | 4/2007 |
| CN | 101337530 A | | 1/2009 |
| CN | 106043209 A | * | 10/2016 |
| CN | 106043210 A | | 10/2016 |

(Continued)

OTHER PUBLICATIONS

JP-2008037326-A; Feb. 2008; Muramatsu, Miki; translated description, 7 pages (Year: 2008).*

(Continued)

*Primary Examiner* — David R Dunn
*Assistant Examiner* — Tania Abraham
(74) *Attorney, Agent, or Firm* — Crowell & Moring LLP

(57) ABSTRACT

A safety belt for a vehicle includes at least one belt strap which has a belt interior arranged between at least two belt strap layers. In order to introduce heat into the vehicle near a vehicle occupant wearing the belt strap, at least one heating element is arranged in the belt interior adjacent to a belt strap layer facing the vehicle occupant wearing the belt strap.

9 Claims, 4 Drawing Sheets

(56) References Cited

FOREIGN PATENT DOCUMENTS

| | | |
|---|---|---|
| DE | 10 2006 011 646 A1 | 9/2006 |
| DE | 10 2006 003 794 A1 | 7/2007 |
| DE | 10 2008 034 633 A1 | 1/2010 |
| DE | 10 2016 014 809 A1 | 5/2017 |
| FR | 2765834 A1 * 1/1999 | ............. B60R 22/12 |
| GB | 2 250 176 A | 6/1992 |
| JP | 2008037326 A * | 2/2008 |
| JP | 2013-226883 A | 11/2013 |
| JP | 2015039901 A * | 3/2015 |

OTHER PUBLICATIONS

PCT/EP2018/061746, International Search Report dated Jul. 2, 2018 (Two (2) pages).

Chinese-language Office Action issued in Chinese Application No. 201880034415.7 dated Jun. 24, 2021 with partial English translation (12 pages).

\* cited by examiner

SAFETY BELT FOR A VEHICLE

BACKGROUND AND SUMMARY OF THE INVENTION

The invention relates to a safety belt for a vehicle having at least one belt strap which comprises a belt interior formed between two belt strap layers.

A safety system for occupants in a motor vehicle, having a motor vehicle seat and a safety belt associated with the motor vehicle seat is known from DE 10 2006 003 794 A1. A buckle tongue is fastened on the safety belt, for positively locking with a belt buckle which is secured to a motor vehicle structure. The extension length of the safety belt can be changed using a belt retractor, and the belt is connected to a gas generator which fills a tubular body with gas in the presence of appropriate sensor data and inflates the body, a gas supply line which can be extended together with the safety belt connecting the gas generator to the inflatable safety belt.

Furthermore, DE 10 2006 011 646 A1 shows a safety belt which comprises a heating element integrated in the belt strap.

The problem addressed by the invention is that of providing a safety belt which is improved over the prior art and has an integration of heating elements in the belt strap that is as advantageous as possible.

A safety belt for a vehicle has at least one belt strap which comprises a belt interior arranged between at least two belt strap layers. According to the invention, at least one heating element is arranged in the belt interior, adjacent to a belt strap layer facing the occupant wearing the belt strap.

By means of the heating element in the belt strap, a close-to-body heating, and thus climatization of the belt strap layer facing the occupant and thus of the occupant wearing the belt strap, can be achieved. Using comparatively little effort and a relatively low energy input, a relatively rapid heating of the occupant can be achieved in a region close to the body, such that it is not necessary to completely heat air in an interior of the vehicle. As a result, electrical heating energy can be saved.

If the vehicle is an electric vehicle or a hybrid vehicle having at least one electric drive unit, relatively high range losses, with respect to available electrical energy required for driving operation, are particularly noticeable in winter driving when outdoor temperatures are comparatively low, if air in the interior of the vehicle is heated by means of a heating device of the vehicle, such as an air conditioning system.

By means of the heating element, the comfort of the occupant can be significantly increased, particularly in the upper body area at the start of a journey when outdoor temperatures are comparatively low, it being possible to achieve a significant saving in electrical energy compared with a conventional heating of the interior.

Due to the fact that the belt strap can be heated, an influence of the cold at the start of the journey is at least significantly reduced by the belt strap on the upper body of the occupant who has put on the belt strap and in particular is not wearing a jacket.

Comfort is increased for the occupant at comparatively low outdoor temperatures, particularly in winter and even in a convertible, by means of the heatable belt strap, a well-being of the occupant or occupants, preferably a driver and a passenger of the vehicle, being increased at the same time.

Advantageously, the belt strap comprises an airbag which is arranged between two belt strap layers and can be supplied with gas, the heating element being arranged between the airbag and the belt strap layer which faces the occupant wearing the belt strap. In this case, a function of the airbag, which in particular triggers when an imminent collision of the vehicle is detected or when a collision of the vehicle is detected, is not impaired by the at least one heating element in the belt strap.

The belt strap advantageously has widened portions in the region of the belt interior, and is folded in this region, the relevant widened portion forming a support element for at least one heating element.

If the belt interior is supplied with gas by the airbag, the belt strap unfolds in this region, such that a contact surface of the belt strap on a body of an occupant is enlarged, and a force exerted by the belt strap on the occupant is distributed as a result. This can reduce a risk of injury to the occupant. In this case, a function of the belt interior, which can be supplied with gas and in particular triggers when an imminent collision of the vehicle is detected or when a collision of the vehicle is detected, is not impaired by the at least one heating element in the belt strap.

A heatable safety belt designed in this manner is technically comparatively easy to implement with relatively little effort, the benefit for an occupant wearing the seat belt being relatively high.

The safety belt can be standardized, such that a seat belt of this kind can be installed in all series, in particular of a vehicle manufacturer.

Embodiments of the invention are explained in more detail below with reference to drawings.

DETAILED DESCRIPTION OF THE DRAWINGS

Parts which correspond to one another are provided with the same reference signs in all drawings.

Figure 1:
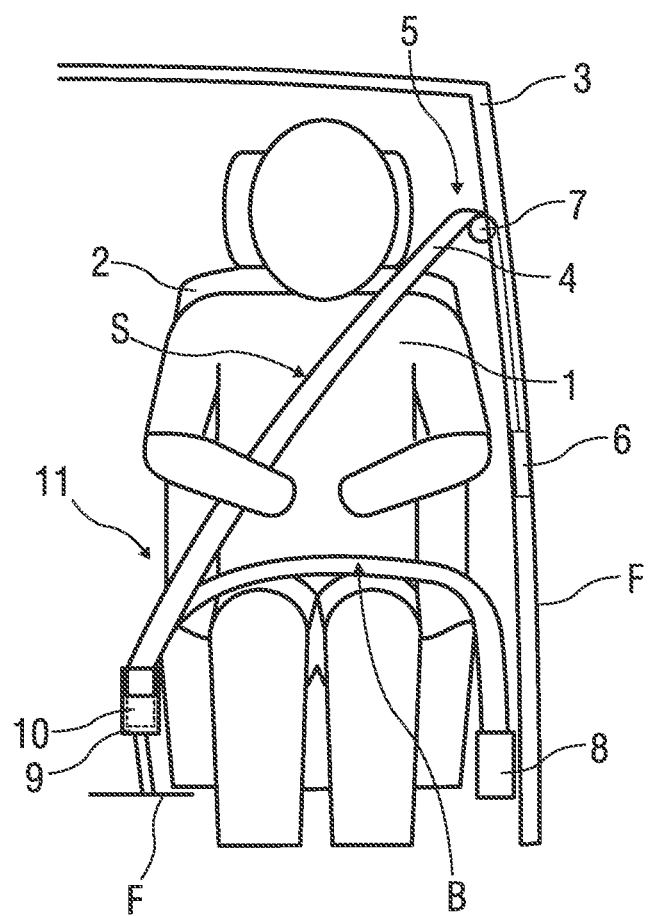
FIG. 1 schematically shows an occupant on a vehicle seat who is wearing a belt strap of a safety belt that comprises a heating element.

FIG. 1 shows an occupant 1 on a vehicle seat 2 in a vehicle 3, the occupant 1 having put on a belt strap 4 of a safety belt 5 which is assigned to him. The occupant 1 depicted in FIG. 1 is in particular a driver of the vehicle 3. However, the occupant may also be the front-seat passenger or a passenger in the back of the vehicle 3.

The belt strap 4 is a component of the safety belt 5 which comprises: a belt retractor 6 which has an integrated belt tensioner, at least one guide roller 7, an end fitting 8 and a buckle 9, into which a belt buckle tongue 10 can be inserted that is displaceably arranged on the belt strap 4.

The safety belt 5 is a three-point belt, the occupant 1 being connected to three points of a vehicle body F when the belt strap 4, which is designed as what is known as a standard belt strap, is put on.

The belt retractor 6 forms a first connection point, the end fitting 8 forms a second connection point, and the belt buckle 9 forms a third connection point.

When the belt strap 4 is in a worn state, the strap is divided into a shoulder belt portion S and a lap belt portion B. The shoulder belt portion S extends obliquely along an upper body of an occupant 1 who has put on the belt strap 4, the lap belt portion B substantially extending in the transverse direction of the vehicle, over a pelvic region of the occupant 1.

Figure 2:
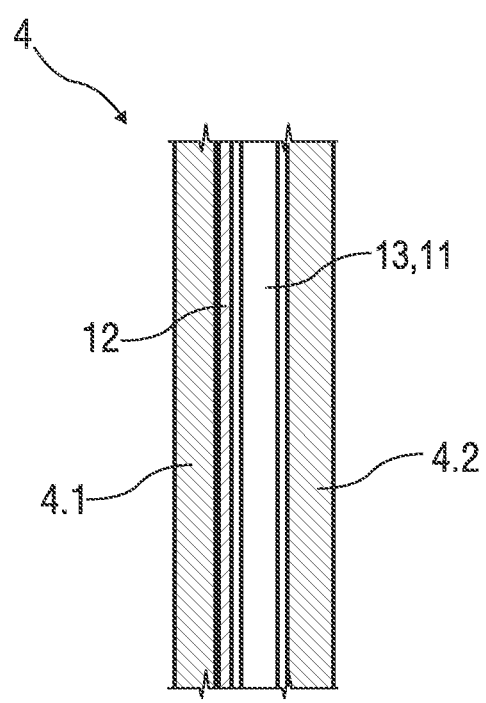
FIG. 2 schematically shows an enlarged section of the belt strap which has a heating element.

The belt strap 4 comprises two belt strap layers 4.1, 4.2 shown in more detail in FIG. 2. When the belt strap 4 is in a worn state, a belt strap layer 4.1 faces towards the occupant 1, a further belt strap layer 4.2 facing away from the occupant 1. A belt interior 13 is therefore produced between the two belt strap layers 4.1 and 4.2, as shown in FIG. 2.

If the vehicle 3 is an electric vehicle or a hybrid vehicle having at least one electric drive unit, relatively high range losses with respect to available electrical energy required for driving operation are particularly noticeable in winter driving when outdoor temperatures are comparatively low, if air in the interior of the vehicle 3 is heated by means of a heating device of the vehicle 3.

In addition, in the event that the occupant 1 gets into the vehicle 3 without a jacket, there is discomfort at the start of driving, in the form of a cold influence on the upper body of the occupant 1, caused by the belt strap 4.

The belt strap 4 is heated by means of at least one heating element 12, in order to substantially reduce the range losses, to increase the comfort of the occupant 1 wearing the belt strap 4, and to reduce the discomfort caused to the occupant 1 by the cold influence of the belt strap 4, and to thereby further increase the comfort and wellbeing of the occupant 1.

In this case, the heating element 12 is arranged in the belt interior 13 towards the belt strap layer 4.1 which faces the occupant 1, i.e., a contact side of the belt strap 4, as shown in a cross-sectional view in FIG. 2.

In one embodiment, the heating element 12 is designed as a heating strand, i.e., as a heating wire, wherein the heating strand can be woven into the belt strap layer 4.1 during production of the belt strap 4.

For example, the heating element 12 in the form of the heating strand is woven into the belt strap layer 4.1, preferably in the shoulder belt portion S, so as to extend in a meandering manner.

In addition, it is conceivable that a non-woven support fabric is arranged between the belt strap layer 4.1 which has the woven heating element 12, and the belt interior 13 such that a better thermal insulation is achieved.

In an alternative or additional embodiment, the heating element 12 is formed as a heating film, which is thermally welded and/or glued to the belt strap 4 such that the heating film is integrally connected to the belt strap 4, and a substantially permanent connection between the heating element 12 and the belt strap layer 4.1 is produced.

As a heating element 12, the heating film comprises a support film, by means of which the heating element 12 is thermally insulated on one side.

In a further alternative or additional embodiment, a non-woven heating fabric can be inserted into the belt strap 4, in particular in the direction of the contact side, as a heating element 12. The non-woven heating fabric, as a heating element 12, is arranged in the belt interior 13 between the belt strap layers 4.1 and 4.2 in the belt strap 4, and may include carbon fibers as a component. In this case, the non-woven heating fabric may have a non-woven support fabric.

The belt strap 4 may be designed in the form of a tube, consisting, for example, of two initially separate belt strap layer 4.1 and 4.2, which are connected at the edges thereof. In this way, a belt interior 13 is formed which extends over almost the entire width of the belt strap 4. For example, a heating element 12 in the form of a non-woven heating fabric can be inserted into a belt interior 13 of this kind, which element has a relatively large width and allows a heating effect over a wide surface of the body of the occupant 1.

Alternatively, a belt strap 4 may be tubular and have wider common edge regions of the belt strap layers 4.1 and 4.2. Although the strap has a somewhat narrower belt interior 13, it offers advantages with regard to the strength of the belt strap 4. For example, in this case a specially woven belt strap 4 may be provided, which has common woven edge regions and separately woven belt strap layers 4.1 and 4.2 between the edge regions in the inner region of the belt strap 4.

The width and length of the belt interior 13 may vary. The heating element 12 which is designed as a heating strand, a carbon heating system or a graphite heating system, is introduced into the belt interior 13 which is formed when the belt strap 4 is tubular, which heating element is introduced together with a support material in the form of a film, a non-woven fabric or another woven fabric, or without the material. In addition to the heating element 12, further functional elements can also be accommodated, such as an airbag element which is described in more detail below, sensors, microphones or elements for electrical contacting, for example.

In a further embodiment which is also shown in FIG. 2, an airbag 11 may be further arranged in the belt interior 13, which can be triggered and supplied with gas when an imminent collision of the vehicle 3 is detected or when a collision is detected. In the event of a collision of the vehicle 3, a contact surface of the belt strap 4 on the body of the occupant 1 is enlarged by means of the airbag 11, as a result of which a load exerted on the occupant 1 by the belt strap 4 and thus a risk of injury can be reduced.

In this case, the heating element 12 is arranged between the airbag 11 and the belt strap layer 4.1 which faces the occupant 1. Thus, the heating element 12 is thermally insulated with respect to the airbag 11 by the non-woven support fabric between the heating element 12 and the airbag 11, such that the airbag 11 is protected from a comparatively high heat input.

In the case that a heating element 12 is a heating film, the same function is fulfilled by the support film, by means of which the heating element 12 is thermally insulated on one side, in particular in the direction of the airbag 11. As a result, a heat input into the airbag 11 is at least reduced. When using a non-woven heating fabric, the non-woven support fabric is arranged in the direction of the airbag 11, and the heating element 12 in the form of non-woven heating fabric is insulated with respect to the airbag 11. As a result, the airbag 11 is largely protected against a heat input from the heating element 12.

Figure 3:
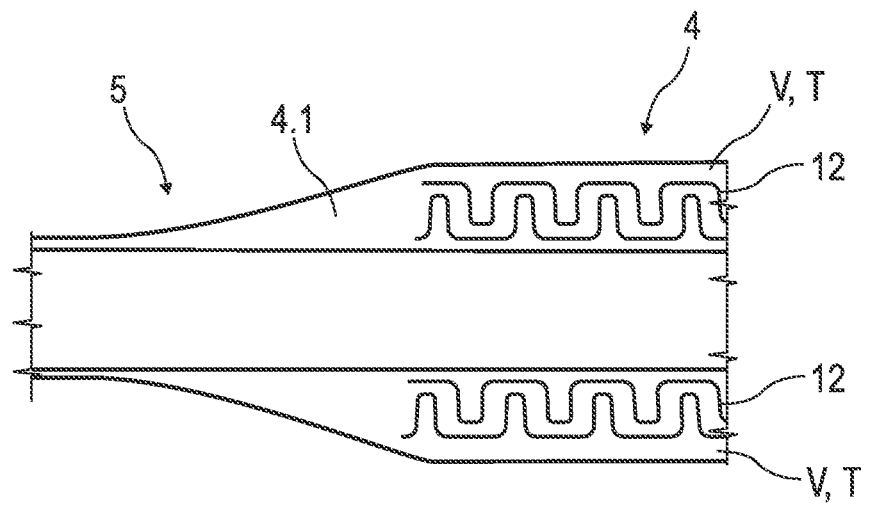
FIG. 3 schematically shows a portion of a belt strap which has heating elements and a belt interior which can be supplied with gas.
Figure 4:
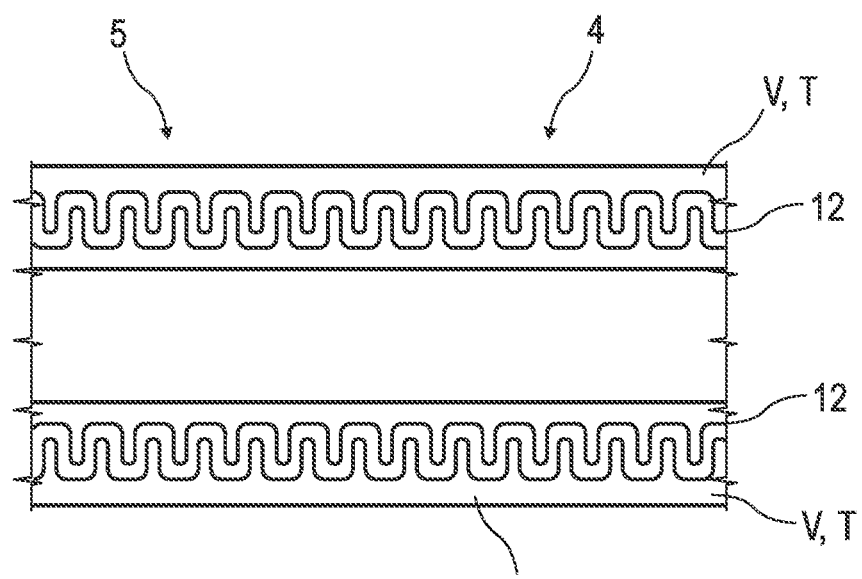
FIG. 4 schematically shows a further portion of the belt strap which has the heating elements and the belt interior.

A portion of an alternative embodiment of the belt strap 4 is shown in each of FIGS. 3 and 4.

In the region of the belt interior 13, the belt strap 4 has wing-like widened portions V prior to folding and turning. These widened portions V are used to increase a contact surface of the belt strap 4 on the body of an occupant 1 wearing the belt strap 4. For this purpose, the belt strap 4 unfolds when the belt interior 13 is supplied with the gas.

In this embodiment, the heating elements 12 are formed as heating wires and arranged in the region of the widened portions V, the heating elements, due to a tuning of the restraint system, being positioned in an optimal position in relation to an occupant 1 wearing the belt strap 4, in order to heat the occupant 1.

When the belt strap 4 is in the folded and turned state, the widened portions V are arranged in the interior of the belt strap 4, such that the heating elements 12 are not visible to an observer, in particular an occupant 1.

In this case the widened portions V each form a support element T for a heating element 12 in the form of a heating wire.

In one possible embodiment, the heating wires, as heating elements 12, are woven into a material of the widened portions V, a heating wire being designed as an electrically conductive thread and/or as an electrically conductive yarn. As a result, a flexibility of the belt strap 4 in the region of the widened portions V is substantially unimpaired.

Due to the arrangement of the heating elements 12 on the widened portions V as support elements T, neither an inflation function of the belt strap 4, in particular with regard to the strength thereof, nor the haptics for an occupant 1 wearing the belt strap 4 are impaired.

Alternatively or additionally, the heating elements 12 may also be stitched onto the widened portions V, the haptics being taken into account accordingly in this case.

The relevant heating element 12 is individually controllable, it being possible for either both heating elements 2 or only one heating element 12 to be activated. That is to say, a heat output of the heating elements 12 can be controlled using a power supply and using the number of activated heating elements 12. It is therefore possible to heat the belt strap 4 in at least two stages.

Figure 5:
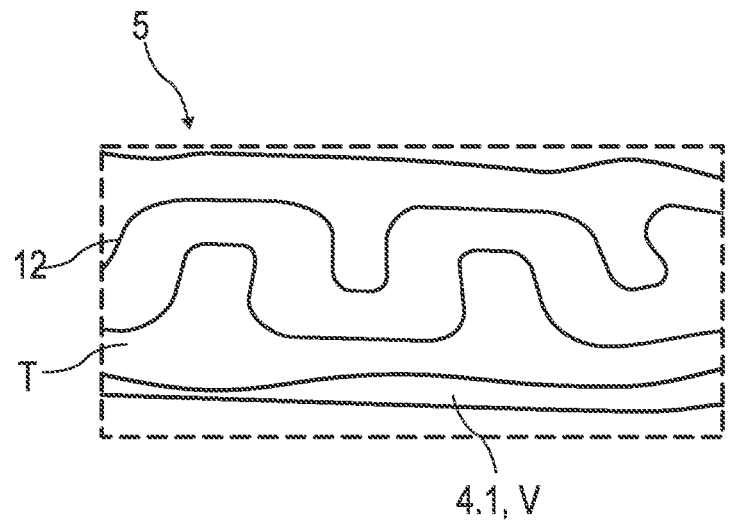
FIG. 5 schematically shows a portion of a belt strap which has an additional support element and a heating element.

FIG. 5 shows a further embodiment of the belt strap 4, an additional support element T being arranged on the widened portion V, to which support element the heating element 12 is attached.

For example, the additional support element T, which is arranged on the widened portion V, is a non-woven fabric which the heating element 12 can be woven into or stitched to.

In one possible embodiment, a plurality of heating elements 12 are provided such that the belt strap 4 can be heated in portions, it also being possible for the heating elements 12 to be coupled to a seat heating system of a vehicle seat 2, with which the safety belt 5 is associated.

In order to supply the heating elements 12 with electrical energy, the heating elements 12 can be connected to an electrical power supply by an end fitting 8 of the safety belt 5.

Irrespective of the particular embodiment, the heating element 12 is connected to a power supply of the vehicle 3, it being possible for the heating element 12 to be activated and deactivated as needed. For this purpose, an actuating element is arranged on the belt strap 4 and/or at another suitable position in the vehicle 3. In this case, a supply line for supplying power to the heating elements 12 may be arranged within the belt interior 13.

A sense of comfort can be increased, in particular in the chest area of the occupant 1 wearing the belt strap 4, using a comparatively low energy input.

A heating element 12 of this kind has a heating time of, for example, 1 minute, it being possible for a heating element 12 of this kind for heating the belt strap 4 to be heated much faster, for example 85% faster, than an existing heating system in the vehicle.

In particular a breast and heart region of the occupant 1 wearing the belt strap 4 can be heated by means of the heatable belt strap 4. The vessels dilate as a result, such that blood circulation is promoted. The feeling of warmth in the body of the occupant 1 can spread due to the blood circulation.

In addition, the immune system can be strengthened by the heat transmitted to the occupant 1, particularly in a cold season, it also being possible for muscular tensions in the musculoskeletal system of the occupant wearing the belt strap 4 to be relieved by the heat.

As mentioned above, the heating elements 12 have a comparatively fast heating time, such that the occupant can take off their jacket even at comparatively low temperatures, even for a relatively short driving distance.

As a result of the fact that the belt strap 4 is heatable and the occupant 1 can take off their jacket at comparatively low outdoor temperatures, the amount of belt slack, which results from wearing a relatively thick jacket, can be reduced in the belt strap 4. Since the slack is thus reduced, the belt strap 4 lies comparatively taut against the occupant 1, as a result of which a restraining force of the belt strap 4 is optimized in the event of a collision of the vehicle.

Furthermore, the belt strap 4, in that the occupant 1 takes off their jacket even for a relatively short driving distance, a positioning of the belt strap 4 with respect to a pelvic area of the occupant is optimized such that, in the event of a collision, the risk of what is known as a submarining effect, slipping under a lap belt portion B of the belt strap 4, can be substantially reduced.

Figure 6:
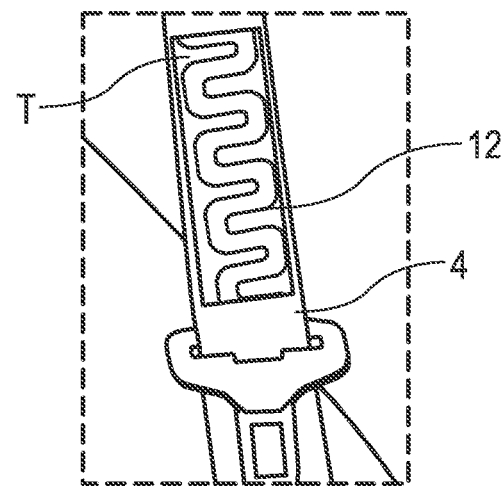
FIG. 6 schematically shows a portion of a belt strap which does not have a heating element or a belt interior which is supplied with gas.

A belt strap 4 without a belt interior 13 which can be supplied with gas is shown in FIG. 6, a support element T being arranged on the belt strap 41, which support element has a heating element 12 in the form of a heating wire.

In this case, the heating element 12, irrespective of the embodiment thereof, forms a contact heating system such that a temperature in the interior of the vehicle 3 can be lowered overall, and thus a considerable saving can be achieved in terms of electrical energy consumption.

The invention claimed is:

1. A safety belt for a vehicle, comprising:
  a belt strap which has a first belt strap layer, a second belt strap layer, and a belt interior disposed between the first belt strap layer and the second belt strap layer, wherein in a worn state of the belt strap as worn by a vehicle occupant, the first belt strap layer faces towards the vehicle occupant and the second belt strap layer faces away from the vehicle occupant; and
  a heating element disposed in the belt interior and in contact with the first belt strap layer,
  wherein the heating element is physically separated from the second belt strap layer.

2. The safety belt according to claim 1, wherein the heating element is a heating strand, a heating film, and/or a non-woven heating fabric.

3. The safety belt according to claim 1, wherein the heating element is woven into the first belt strap layer, is glued to the first belt strap layer, and/or is thermally welded to the first belt strap layer.

4. The safety belt according to claim 1, wherein the belt strap is a tube having the first belt strap layer and the second belt strap layer which are separated from one another and which each have a respective edge region which are connected to each other.

5. The safety belt according to claim 1, wherein the belt strap is a tube having the first belt strap layer and the second belt strap layer which are separated from each other in a region of the belt interior, and which together form a common belt strap region disposed in a respective edge region of the first belt strap layer and the second belt strap layer.

6. The safety belt according to claim 1, wherein the belt strap has an air bag which is disposed between the first belt strap layer and the second belt strap layer and which is suppliable with a gas and wherein the heating element is disposed between the airbag and the first belt strap layer.

7. The safety belt according to claim 1, wherein the belt strap has widened portions in a region of the belt interior, wherein the belt strap is folded in the region, and wherein one of the widened portions forms a support element for the heating element.

8. The safety belt according to claim 7, wherein the heating element is a heating wire and is woven into the one of the widened portions.

9. The safety belt according to claim 1, wherein a heat output of the heating element is adjustable.

* * * * *